UNITED STATES PATENT OFFICE.

JACOB EFREM, OF BERLIN, GERMANY.

INCRUSTATION PREVENTIVE.

SPECIFICATION forming part of Letters Patent No. 456,760, dated July 28, 1891.

Application filed June 4, 1890. Serial No. 354,276. (No specimens.)

*To all whom it may concern:*

Be it known that I, JACOB EFREM, of Berlin, in the Kingdom of Prussia and German Empire, have invented certain new and useful Improvements in the Means for Dissolving Boiler Scale or Incrustation and for Preventing the Formation of the Same, of which the following is a specification.

This invention relates to a new or improved preparation or composition for dissolving boiler-scale and for preventing the further formation of such scale. The action of the composition is such as to transform into mud boiler-scale already formed, which can then be drawn or blown off from the boiler, and also, when constantly employed, to prevent any further formation of such scale.

The new or improved preparation or composition consists of the following substances in or about the proportions mentioned, viz: twenty-five parts, by weight, of potato-starch; twenty-five parts, by weight, of concentrated lye; three parts, by weight, of glue; forty-seven parts, by weight, of water. The starch is first dissolved in cold water, and then stirred up in boiling water until the whole has assumed the consistency of thick gruel or porridge. When this mass has become cold, the concentrated lye is poured upon it and the whole is well stirred up. The glue, previously soaked or softened in cold water, is boiled with the water, which is stirred up with the starch, as hereinbefore mentioned.

The composition thus prepared is used as follows: To remove boiler-scale already formed a suitable quantity—say about twenty grams of the composition for every nine square meters of heating-surface—is dissolved in hot water and added daily to the feed-water supplied to the boiler. When the boiler-scale has been removed, the composition need be added but once per week to prevent the further formation of scale.

The composition hereinbefore described is quite free from acid, so that it does not injuriously affect the boiler-shell and other heated parts or the packing, and since the composition is completely dissolved by water it can also be employed in water for use in dye-works, breweries, and all works which employ the steam direct.

What I claim, and desire to secure by Letters Patent of the United States, is—

The improved preparation or composition for dissolving boiler scale and for preventing formation of such scale, consisting of twenty-five parts, by weight, of potato-starch; twenty-five parts, by weight, of concentrated lye; three parts, by weight, of glue, and forty-seven parts, by weight, of water.

In witness whereof I have hereunto set my hand in presence of two witnesses.

JACOB EFREM.

Witnesses:
PAUL FISCHER,
WILHELM SCHWISTHAL.